(12) United States Patent
Holsinger

(10) Patent No.: US 6,853,655 B2
(45) Date of Patent: Feb. 8, 2005

(54) SYSTEM FOR IMPROVED POWER CONTROL

(75) Inventor: Kevin Holsinger, Menlo Park, CA (US)

(73) Assignee: Spectra Physics, Inc., Mountain View, CA (US)

( * ) Notice: Subject to any disclaimer, the term of this patent is extended or adjusted under 35 U.S.C. 154(b) by 0 days.

(21) Appl. No.: 10/301,801

(22) Filed: Nov. 20, 2002

(65) Prior Publication Data

US 2003/0138006 A1 Jul. 24, 2003

Related U.S. Application Data

(60) Provisional application No. 60/331,967, filed on Nov. 20, 2001.

(51) Int. Cl.[7] .................................................. H01S 3/13
(52) U.S. Cl. ...................... 372/29.011; 372/9; 372/38.1; 372/38.01; 372/38.02
(58) Field of Search .................... 372/29.01, 29.011, 372/29.012, 29.02, 29.021, 9, 38.1, 38.01, 38.02

(56) References Cited

U.S. PATENT DOCUMENTS

| 5,410,559 | A | * | 4/1995 | Nighan et al. ............... 372/19 |
|---|---|---|---|---|
| 5,442,648 | A | * | 8/1995 | DuBose et al. ........... 372/38.08 |
| 5,495,362 | A | | 2/1996 | Takatu et al. ................ 359/333 |
| 5,656,186 | A | | 8/1997 | Mourou et al. ......... 219/121.69 |
| 5,680,246 | A | * | 10/1997 | Takahashi et al. ...... 359/341.43 |
| 5,693,931 | A | * | 12/1997 | Wade ......................... 250/205 |
| 5,720,894 | A | | 2/1998 | Neev et al. .................... 216/65 |
| 5,987,049 | A | * | 11/1999 | Weingarten et al. ........... 372/70 |
| 6,333,485 | B1 | | 12/2001 | Haight et al. ........... 219/121.68 |
| 6,433,305 | B1 | | 8/2002 | Liu et al. ................ 219/121.71 |

\* cited by examiner

*Primary Examiner*—Wilson Lee
*Assistant Examiner*—Leith A Al-Nazer
(74) *Attorney, Agent, or Firm*—Paul Davis; Heller Ehrman White & McAuliffe

(57) ABSTRACT

A laser system includes a pump source that produces a first output. The pump source has a feedback loop with a first summing junction and a first command that has step quantization or digitized set point. An output device is coupled to the pump source to receive the first output and produce a second output. A feedback loop is coupled to the first summing junction. The feedback loop includes a second summing junction coupled to at least a portion of the second output. The second summing junction receives a second command and provides an input to the first summing junction. The feedback loop reduces the step quantization from the first output to provide finer control step of a property of the second output.

48 Claims, 3 Drawing Sheets

SYSTEM FOR IMPROVED POWER CONTROL

CROSS-REFERENCE TO RELATED APPLICATIONS

This application claims the benefit of U.S. Ser. No. 60/331,967, filed Nov. 20, 2001, which application is fully incorporated herein by reference.

BACKGROUND

1. Field of the Invention

The present invention relates generally to stabilizing a property of the output of a laser system, and more particularly to an optical system including a laser where finer tuning of the output power is required than is provided by standard, built-in digital set points.

2. Description of the Related Art

In recent years, medical and industrial applications using pulsed laser systems have proliferated. As the lasers have become more reliable and commonplace, there has also been a greater emphasis on improving control of the laser parameters so as to improve outcomes in practical settings. Providing the required controls presents a greater challenge as increasingly complex laser systems are being introduced into applications which place stringent demands on performance and operating lifetime even as preferred devices are required to be more compact and cost effective. Ultra-fast lasers, build-up cavities involving resonant frequency doubling, systems including optical parametric conversion devices and multiple harmonic modules and high power fiber lasers are all examples of complex laser systems requiring sophisticated controls to perform their intended functions.

Ultrashort pulse lasers have, in particular, been promoted as an effective new tool for a variety of medical and industrial applications, and especially where small interactions zones, fine feature sizes and limited collateral damage are considered highly beneficial. Examples include metrology measurements, two-photon microscopy, material processing, stereolithography and corneal sculpting procedures. In the case of material processing applications ultrafast lasers exploit localized laser induced breakdown mechanism to provide submicron processing capability. Some applications exploit the ability of ultrafast lasers to ablate surface regions that are even smaller than their minimum, diffraction limited spot size. Many micromachining, inscription and hole drilling procedures have been proposed that take advantage of the high degree of precision provided by ultrafast interactions. Examples include: drilling holes with sub-wavelength pitch as may be used to produce photonic crystals as described in U.S. Pat. No. 6,433,305, removal of biological and other types of material incurrring minimal collateral damage and greatly increased cut quality as taught in U.S. Pat. No. 5,720,894, precise surface ablation in either opaque or transparent materials as described in Pat. No. 5,656,186 and No. 6,333,485 and inscription of micro patterns in various materials.

The efficacy of micro-machining procedures carried out with ultrashort pulse lasers depends in a large measure on the precision of controls provided by the system of the key output laser parameters including power, pulse energy and/or pulse width. In particular, controlling and stabilizing the output power is essential to the precision with which micro-holes can be drilled, micro-patterns can be inscribed or clean repeatable cuts are performed. Procedure repeatability and high throughputs are especially important considerations for virtually all industrial, biological and surgical applications which contemplate the use of ultrafast lasers.

Another especially good example of an application requiring a high degree of control is provided by emerging metrology applications such as the ultrasonic short pulse technique (known by trade name MetaPULSE) successfully developed into a semiconductor inspection tool at Rudolph technologies. The technique uses femptosecond pulses to produce ultrasonic echoes which are analysed to derive the thickness of single or multi-layer metal films used in integrated circuit manufacturing. at high throughput rates. With metal layers ranging from under 20 Å to over 5 $\mu$m, high precisions with better than 1–2% repeatability are required along with high throughput rates. Precise control of key laser parameters is therefore essential characteristic for this application. In particular, variations in power can contribute to nonuniformities in thickness measurements which can compromise the measurements.

In many of foregoing applications, it is required that the laser be capable of hands-off reliable operation for prolonged periods of time in an industrial or medical setting. At the same time during the time the output laser beam is coupled to a work piece, the laser must provide power levels and other operational characteristics that are as constant as possible and be free of long term drift or unpredictable power instabilities.

Generally, it is known that uncontrolled fluctuations in power or other laser parameters such as the pulse width, wavelength or beam divergence lower the accuracy of the laser interactions with a target material and compromise the system performance. Whereas methods of stabilizing operating laser parameters are known in the art, many such techniques require numerous additional components and are too complex to implement in an industrial setting especially where reliable throughputs and space considerations are paramount. It is highly desirable to provide a laser system with improved reliability and stabilized output control features on a fine scale using the most expeditious and cost effect means.

Typically, the more complex laser systems that are the subject of the present invention comprise at least two or more key subsystems, each of which may be a laser cavity or optical system. In this case changing parameters of an output beam which is the one delivered to the target requires controlling an existing input system or subsystem with its own fully designed control electronics and drivers.

For example, one subsystem may be a pump laser such as a commercially available diode pumped green laser that can be used to pump another subsystem, such as a Ti:sapphire laser. Other possible subsystems might include an optical parametric converter or a Raman shifter to provide a fixed set of wavelengths. In still other examples the optical subsystem may include build up cavities for resonant harmonic conversion or an injection seeded amplifier.

In all of these cases, controlling and adjusting the output power of a laser consisting of one or more complex subsystems can be a major issue. For example, requiring fine control of selected properties of an output beam such as pulsewidth or the power can present an issue when the driver electronics are controlled digitally. Any digital controller has a finite number of quantized command levels. These quantized command levels are often too coarse to provide the high-resolution control of the output power of the system as required to meet the needs of certain applications. This can be an even more of an issue when there are additional noise and/or bandwidth specifications on the output of the system.

There is a need for techniques that can provide a high degree of control of selected properties of the output from optical systems which may include one or more laser subsystems. There is a particular need for cost effective techniques that allow making smaller adjustments to the output power of the system than is currently possible with digital set points or some other quantized means. There is further need to be able to make these adjustments sufficiently fast to maintain adequate throughput rates for the applications contemplated by the system.

SUMMARY

Accordingly, an object of the present invention is to provide an improved optical system that includes an optical system pumped by a pump source.

Another object of the present invention is to provide an improved laser system with a feedback system that is used to stabilize the output of the laser system.

Another object of the present invention is to provide a laser system with a feedback loop that reduces step quantization.

Yet another object of the present invention is to provide a laser system that provides a high degree of control of selected properties of the output.

Still a further object of the present invention is to provide a laser system that allows making smaller adjustments to the output power than is currently possible with digital set points or some other quantized means.

Another object of the present invention, is to provide a laser system that allows making smaller adjustments to the output power sufficiently fast to maintain adequate throughput rates for the applications contemplated by the system.

A further object of the present invention is to provide an optical system with a cavity pumped by a pump source that also maximizes the efficiency of the cavity.

These and other objects of the present invention are achieved in an optical system with a pump source that produces a first output. The pump source is coupled to a digitized set point which provides coarse control of a property of first output through a first command carried by a first feedback loop containing a first summing junction. An optical system is coupled to the pump source to receive a first output, modify the property to produce a second output. A monitor receives at least a portion of the second output and is configured to provide a readout of the modified property. A second feedback loop includes a second summing junction coupled to the monitor. The second summing junction issues a second command to the pump source and provides fine control of the property of the first output. The modified property of the second output is altered on a finer scale than that provided by the digitized set point.

In another embodiment of the present invention, an optical system is provided with a pump source that produces a first output. The pump source is coupled to a digitized set point which provides step quantization of a property of first output through a first command carried by a first feedback loop containing a first summing junction. An optical system is coupled to the pump source to receive a first output, modify the property to produce a second output. A monitor receives at least a portion of the second output and is configured to provide a readout of the modified property. A second feedback loop includes a second summing junction coupled to the monitor. The second summing junction issues a second command to the pump source and provides fine control of the property of the first output. The modified property of the second output is altered on a finer scale than that provided by the digitized set point.

In another embodiment of the present invention, a laser system has a pump source that produces a first output. The pump source includes a feedback loop with a first summing junction and a first command that has step quantization. A feedback loop is coupled to the first summing junction. The feedback loop has a second summing junction coupled to at least a portion of the first output, the second summing junction receiving a second command and providing an input to the first summing junction, the feedback loop reducing the step quantization from the first output to reduce step quantization of the first output.

In another embodiment of the present invention an optical system has a pump source that produces a first output beam. A cavity is pumped by the first output beam and produces a second output beam. A power monitor is positioned to receive at least a portion of the second output beam. In response to a signal from the power monitor an efficiency of the cavity is maximized by adjusting a position of the first output beam relative to the cavity.

In another embodiment of the present invention, a laser system includes a pump source with quantized commands and a first summing junction. The pump source produces a first output. An output device is positioned to receive the first output and produce a second output. A second summing junction is coupled to at least a portion of the first output and provides an input to the first summing junction. A third summing junction is coupled to at least a portion of the second output and receives a second command. The third summing junction provides an input to the second summing junction.

In another embodiment of the present invention, a laser system includes a pump source with quantized commands and a first summing junction. The pump source produces a first output. A second summing junction is coupled to at least a portion of the first output and provides an input to the first summing junction. A third summing junction is coupled to at least a portion of the first output and receives a second command. The third summing junction provides an input to the second summing junction.

DETAILED DESCRIPTION OF THE PREFERRED EMBODIMENTS

Figure 1:
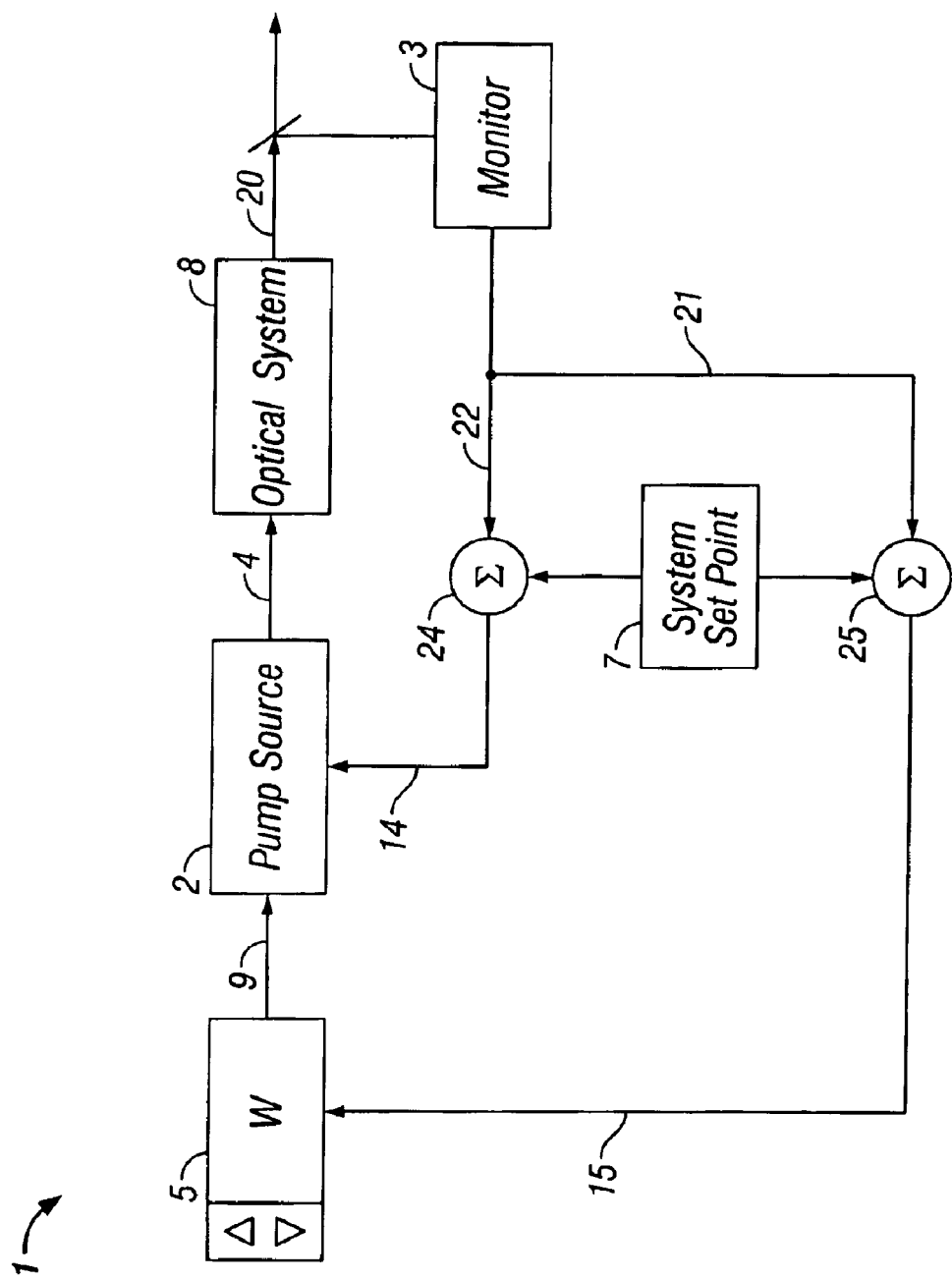
FIG. 1 is a schematic diagram of a system with at least one summing junction designed to provide finer control of an existing pump source controlled by a step quantized set point.

Referring now to FIG. 1, one embodiment of the present invention is a laser system 1 with a pump source 2 that produces a first output 4 which is operatively coupled to and drives an optical system 8, which produces a second output 20. In one embodiment, pump source 2 is a laser and the output 4 is a first laser beam of properties that can be adjusted using electronic controls embedded within pump source 2. In other embodiments, the pump source may comprise other excitation devices such as known in the art of pumping lasers, including but not limited to fiber coupled diode lasers, diode stacks, flashlamps and e-beams. Most typically, pump source 2 is controlled by a quantized signal 9 corresponding to digitized set-point 5. The optical system 8 converts output 4 to a second laser beam 20 which has the properties generally dictated by the application.

These properties may be monitored at least by first monitor 3 which receives at least a portion of output 20. The reading from monitor 3 may be compared to the desired value of said property as represented by a system set point 7 through a first summing junction 25 included as part of a feedback loop 21. In preferred embodiment the monitor is a power detector designed to measure the average power of the beam. Alternative measuring devices include energy and peak power monitors.

The comparison of the readout from monitor 3 to the system set point thus generates an error signal 15 which is coupled to the digital set-point 5. In various embodiments of system 1, summing junction 25, feedback loop 21 and system set point 7 may be part of a system controller.

Because of the step quantization inherent to digitally controlled systems, commands issued by the set-point 5 in response to first error signal 15 have an embedded step quantization, hence feedback loop 21 provides coarse control of the property monitored by device 3. Yet, for the challenging applications for which laser system 1 is the device of choice, it is often desirable to provide much finer adjustments of the output 20 than is possible with the coarse controls described above. To address this need, a second feedback loop 22 coupled to pump source 2 is also provided. Feedback loop 22 includes a second summing junction 24 which is operatively coupled to at least part of output 20 through the readout of monitor 3. In response to deviation of the readout from desired value of said property stored by the system set point 7, the second summing junction 24 issues a second error signal 14 that is capable of directly affecting analog controls within the electronics subsystems of pump source 2 thereby by-passing the external, quantized set point 5. Consequently, much finer adjustments of the said property can be obtained than is possible through the coarse controls provided by first feedback loop 21.

For illustration purposes, a particular example of the system and principles of the invention is provided by an ultrafast system wherein the pump source consists of a frequency doubled Nd-doped solid state laser producing a green CW beam of given power and the second optical system is a mode-locked Ti:sapphire laser producing IR output with pulse durations in the femtosecond range. Commercial products of this system are available for example, from Spectra-Physics where the green pump laser is known under the trade name "Millenia" and the entire femptosecond laser system is known by the trade name "Mai-Tai". In available commercial embodiments, the output power of the standard Millenia can be altered by sending commands through a serial port loosely corresponding to the digitized set point 5 indicated in FIG. 1. In the Mai-Tai laser system such adjustments may be carried out in response to an error signal through a feedback loop coupled to a power monitor responsive to the IR power from the Ti:sapphire laser. However, with this digital set point the output power from the Millenia can be adjusted only in steps of 10 mW or more which may not provide the fine tuning required for challenging applications such ultrasonic based metrology and certain micro-machining procedures.

The attenuator may comprise an AO modulator which is responsive to the output of the IR power monitor. While such a solution may be practically implemented, it comes at the cost of additional components, which can add to the overall complexity and maintenance expenses of the system. By contrast, adding fine control to the system according to principles of this invention requires only some additional electronic circuitry, which adds minimal complexity and/or costs. The only requirement is that there be a point of access to the internal schematics of the pump laser electronics, preferably at an analog portion of the circuitry.

Figure 2:
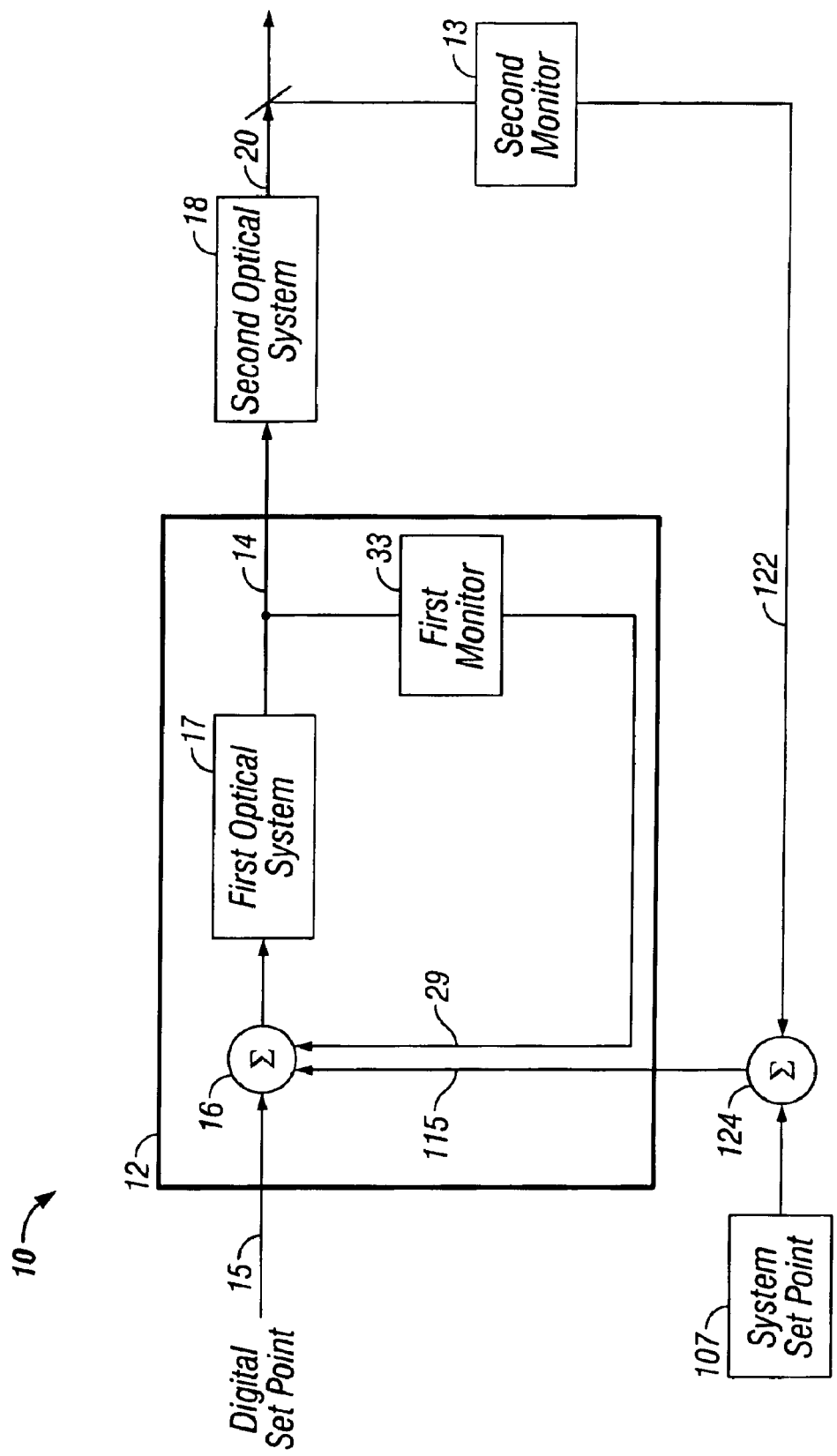
FIG. 2 is a schematic diagram of one embodiment of the present invention illustrating the manner of accessing finer control features within the pump source.

FIG. 2 illustrates one embodiment demonstrating a preferred approach for accessing the analog portion of the electronics of the pump source. As shown in FIG. 2, system 10 includes a pump source 12 which comprises first optical device 17 producing first output beam 14. A second optical system 18 converts the first output 14 into a second output 20. At least a portion of output 20 is intercepted by second monitor 13, which measures a particular property of the second output. In preferred embodiment the monitor is a power detector designed to measure the average power of the beam. Alternative measuring devices include energy and peak power monitors. Pump source 12 further comprises a feedback loop 29 which responds to readouts from a first monitor 33 coupled to part of first output 14 and measuring the said property.

Feedback loop 29 provides input signals to a first summing junction 16 which is also responsive to a first command 15 that has step quantization. The command may be issued by a digitized set point as was described above, or any other control device which includes step quantized adjustments. The first feedback loop 29 included within pump source 12 effectively guarantees that output 14 responds to input 15. In this representation, the first optical device 17 converts a coarse electrical signal 15 into an optical output 14. In preferred embodiments the first optical system 17 may comprise a pump laser, for example, a green diode pumped frequency doubled laser such as the Millenia noted above.

Referring again to FIG. 2, a second feedback loop 122 is coupled to second summing junction 124 which also receives signal from system set point 107. The summing junction 124 an error signal 115 based on comparison with system set point 107. This error signal provides, in turn input signals to first summing junction 16, which issues commands to the first optical system 17, thereby altering the said property of first output 14. According to principles of the present invention the input 115 from first summing junction 124 to a second summing junction 16 bypasses the portion of the circuitry responsive to step quantized, or digital commands as represented by embedded feedback loop 29. Feedback loop 122 and the corresponding error signal 115 it generates is therefore seen to provide finer control of the said property of the output 20 than was possible originally, using only the digitized set point 15.

Effectively, the step quantization of second output 20 may be thus reduced to levels limited only by the resolution of the monitor 13 and the speed of the electronic processing. The key aspect of the invention is thus seen to comprise methods of accessing the analog portion of electronics embedded within a pump source 12 using an external summing junction 124 which bypasses the digital control port of the power supply driving the first optical system 17.

In various embodiments of the present invention, the use of the circuitry to control output of the system can be generally very fast, providing for maximum bandwidth. This can be important for applications where additional bandwidth and noise requirements are imposed on the laser system. By comparison, it is understood that the summing function may also be carried out by software resources using a suitable algorithm designed into the central computer. Generally, however, software control has a slower response than is available with traditional electronic circuitry. All summing techniques known in the art of system control fall however within the scope of the present invention.

Figure 3:
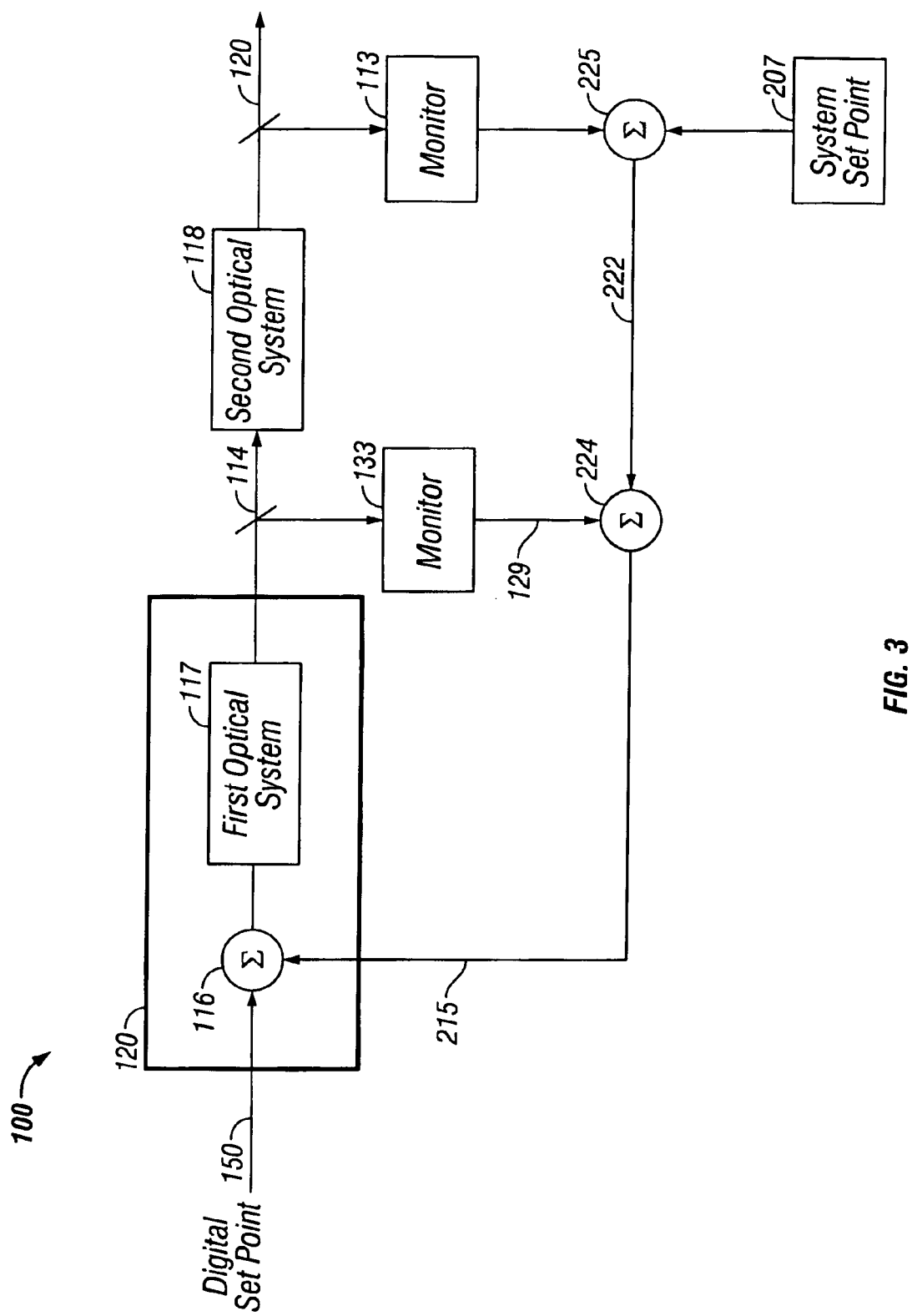
FIG. 3 is a schematic diagram of another embodiment of the present invention with two summing junctions and a single feedback loop coupled to the pump source designed to provide fine control of a property of the system.

With reference now to FIG. 3, another embodiment of the present invention is a laser system 100 that include a pump source 120 with quantized commands from digital set point 150 and a first summing junction 116. First optical system 117 produces a first output 114 with the particular property to be controlled by system 100. A second optical device 118 is positioned to receive first output 114 and produce a second output 120 with a modified property that may be measured by monitor 113. A second summing junction 225 is coupled to at least a portion of second output 120 through measurements provided by monitor 113.

Second summing junction 225 is also coupled to system set point 207 delineating the desired value of said modified property of output 120. Comparison to values received from monitor 113 provides an error signal 222 into a third summing junction 224 which responds to input 129 from a first monitor 133 coupled to at least part of output 114. Third summing junction 224 provides a second error signal 215 to first summing junction 116 used to control the first optical system 117, thereby bypassing the coarse controls provided by quantized set point 150. The advantage offered by the embodiment of system 100 over the embodiment of system 2 represented in FIG. 2, is that the critical summing junctions and monitors are located external to the pump source box, requiring only nominal access to control electronics schematics of pump source 120. This represents the most straightforward method for providing fine control to a system where only quantized, coarse controls were originally built in.

It is noted that in various embodiments of the system and methods of the present invention, either pump sources 2, 12, and 120 or second optical system 8, 18 and 118 can include a mode locking device including but not limited to, a multiple quantum well saturable absorber, a non-linear mirror mode locker, a polarization coupled mode locker, an acousto-optic modulator, and the like. Pump sources 12, 12 and 120 can include a Nd-doped laser with a second harmonic generator to provide CW or mode-locked green beams used to drive a tunable IR device comprising the second optical system 8, 18 and 118. The tunable device may be selected from among a variety of optical crystals and devices, including, but not limited to tunable Ti:sapphire laser an OPO or a Raman converted system. Alternatively, the second optical system may comprise a build up cavity providing resonantly converted harmonics of the first output beam, a high power amplifier or a high power fiber laser amplifier.

Pump sources 2, 12, and 120 can include a variety of different gain media including but not limited to, Nd:YVO$_4$, Nd:YAG, Nd:YLF, Nd:Glass, Ti:sapphire, Cr:YAG, Cr:Forsterite, Yb:YAG, Yb:KGW, Yb:KYW, Yb:glass, KYbW, YbAG, and the like. In one embodiment, the gain media is Nd:YVO$_4$ pumped conventionally by diodes emitting near 808 nm or by direct excitation near 880 nm.

For example, the fine control features that are provided by the present invention may be especially beneficial to systems including amplification of selected pulse shapes using MOPA configurations where the amplifier may consist of a cladding pumped fiber or a suitable solid state laser. The desirability of such a system for material processing applications were discussed, for example, in U.S. Pat. No. 6,281,471, incorporated herein by reference.

Methods directed towards producing selected laser induced surface modification reactions in a substrate which may be moving relative to a laser beam as was described in U.S. Pat. No. 6,350,326, incorporated herein by reference, can also benefit from the improved electronic control provisions covered within the scope of the disclosure. In particular, such processing applications of moving parts may require a programmable feedback control with prescribed laser power in a process producing laser induced surface modification.

Selected beam width as well as wavelengths may be additional properties that must be adjusted so they can be used as input to programmable feedback control system. It would be straightforward to couple the fine controls and feedback provisions made as part of the present invention to benefit applications requiring programmable feedback control from a work piece.

While the invention has been described in connection with what is presently considered to be the most practical and preferred embodiment, it is to be understood that the invention is not limited to the disclosed embodiment, but on the contrary it is intended to cover various modifications and equivalent arrangement included within the spirit and scope of the claims which follow.

What is claimed is:

1. An optical system, comprising:

a pump source that produces a first output;

a first feedback loop that includes a first summing junction and a digital set point that issues commands in response to an error signal to provide coarse control of a property of the first output through step digitization;

an optical device coupled to the pump source to receive the first output and modify the property to produce a second output;

a monitor receiving at least a portion of the second output configured to provide a readout of the modified property, and a second feedback loop including a second summing junction operatively coupled to the monitor, the second summing junction issuing a second command to the pump source to provide fine control of the property of the first output, wherein the modified property of second output is altered on a finer scale than that provided by the digital set point.

2. The optical system of claim 1 wherein the first pump source is a laser system.

3. The laser system of claim 2, wherein the pump laser system is a green laser.

4. The system of claim 3 wherein the green laser is a diode pumped, frequency double Nd-doped laser.

5. The system of claim 2 wherein the laser system is operated CW.

6. The system of claim 2 wherein the laser pump source includes a mode locking device.

7. The system of claim 2 wherein the laser pump source is operated in a Q-switched mode.

8. The system of claim 1 wherein the optical device is a tunable laser.

9. The system of claim 8 wherein the tunable laser is Ti-doped sapphire.

10. The system of claim 8 wherein the tunable laser is an optical parametric oscillator.

11. The optical system of claim 1 wherein the optical device is a mode locked laser.

12. The optical system of claim 1 wherein the pump source is a plurality of semiconductor lasers.

13. The system of claim 1 wherein the optical device is a fiber laser system and the pump source is an array of semiconductor lasers.

14. The system of claim 1 wherein the property of the first output is selected from a group consisting of average power, pulse energy or pulse repetition frequency.

15. The system of claim 1 wherein the second command issued to the pump source accesses an analog portion of the pump source electronics.

16. The optical system of claim 1 wherein the property of first output is selected to affect a laser induced surface modification process.

17. An optical system, comprising:
a pump source that produces a first output of a property of first output through first command carried by a first feedback loop containing a first summing junction;
a first feedback loop including a first summing junction and a digitization set point that issues commands in response to an error signal to provide coarse control of a property of the first output through step digitization;
an optical system coupled to the pump source to receive the first output and modify the property to produce a modified property of a second output;
a monitor receiving at least a portion of the second output configured to provide a readout of the modified property; and
a second feedback loop including a second summing junction operatively coupled to the monitor, the second summing junction issuing a second command to the pump source to provide fine control of the property of the first output; and wherein the modified property of the second output is correspondingly altered on a finer scale than that provided by the digitization set point.

18. A laser system, comprising:
a pump source that produces a first output, the pump source including a first feedback loop with a first summing junction, and a first command that is digitally quantized with a step digitization;
an output device coupled to the pump source to receive the first output and produce a second output; and
a second feedback loop coupled to the first summing junction, the second feedback loop including a second summing junction coupled to at least a portion of the second output, the second summing junction receiving a second command and providing an input to the first summing junction, the second feedback loop reducing step digitization from the first output to produce the second output comprising finer control features.

19. The system of claim 18, wherein the pump source is a laser comprising a gain medium selected from Nd:YVO$_4$, Nd:YAG, Nd:YLF, Nd:Glass, Ti:sapphire, Cr:YAG, Cr:Forsterite, Yb:YAG, Yb:KGW, Yb:KYW, Yb:glass, KYbW and YbAG.

20. The system of claim 19, wherein the gain medium is Nd:YVO$_4$.

21. The system of claim 19, wherein the Nd-doped gain medium is pumped at 880 nm.

22. The system of claim 18, wherein the pump source is fiber coupled.

23. The system of claim 18, wherein either the output device or the pump source includes a mode locking device.

24. The system of claim 23, wherein the mode locking device is a multiple quantum well sturable absorber.

25. The system of claim 23, wherein the mode locking device is a non-linear mirror mode locker.

26. The system of claim 23, wherein the mode locking device is a polarization coupled mode locker.

27. The system of claim 23, wherein the mode locking device is an acousto-optic modulator.

28. The system of claim 18, wherein the pump source includes a second harmonic generator.

29. The system of claim 18, wherein the output device is an optically pumped laser.

30. The system of claim 18, wherein the output device is a build up cavity.

31. The system of claim 30, wherein the build up cavity includes non-linear optical components.

32. The system of claim 18, wherein the output device is a non-linear device.

33. The device of claim 18, wherein the output device is a frequency doubler.

34. The laser system of claim 18, wherein the pump source is a green laser.

35. The system of claim 34 wherein the green laser is a diode pumped, frequency doubled Nd-doped laser.

36. The system of claim 34 wherein the green laser is operated CW.

37. The system of claim 34 wherein the laser pump source is operated in a Q-switched mode.

38. The system of claim 18 wherein the output device is a tunable laser.

39. The system of claim 38 wherein the tunable laser is Ti-doped sapphire.

40. The system of claim 38 wherein the tunable laser is an optical parametric oscillator.

41. The laser system of claim 18 wherein the pump source is a plurality of semiconductor lasers.

42. The system of claim 41 wherein the output device is a fiber laser system.

43. The system of claim 18 wherein the property of the first output is selected from a group consisting of average power, pulse energy or pulse repetition frequency.

44. The system of claim 18 wherein the second command issued to the pump source accesses an analog portion of the pump source electronics.

45. The optical system of claim 18 wherein the property of first output is selected to affect a laser induced surface modification process.

46. A laser system, comprising:
a pump source that produces a first output, the pump source including a first feedback loop with a first summing junction, and a first command that has step digitization; and
a second feedback loop coupled to the first summing junction, the second feedback loop including a second summing junction coupled to at least a portion of the first output, the second summing junction receiving a second command and providing an input to the first summing junction, the second feedback loop reducing the step digitization from the first output to reduce step digitization of the second output.

47. A laser system, comprising:
a pump source with digitized commands and a first summing junction, the pump source producing a first output;
an output device coupled to the pump source to receive the first output and produce a second output;
a second summing junction coupled to at least a portion of the first output and providing an input to the first summing junction; and
a third summing junction coupled to at least a portion of the second output and receiving a second command, the third summing junction providing an input to the second summing junction.

48. A laser system, comprising:
a pump source with digitized commands and a first summing junction, the pump source producing a first output;
a second summing junction coupled to at least a portion of the first output and providing an input to the first summing junction; and
a third summing junction coupled to at least a portion of the first output and receiving a second command, the third summing junction providing an input to the second summing junction.

* * * * *